H. FISHER.
BELL-HANGING.
No. 175,600. Patented April 4, 1876.
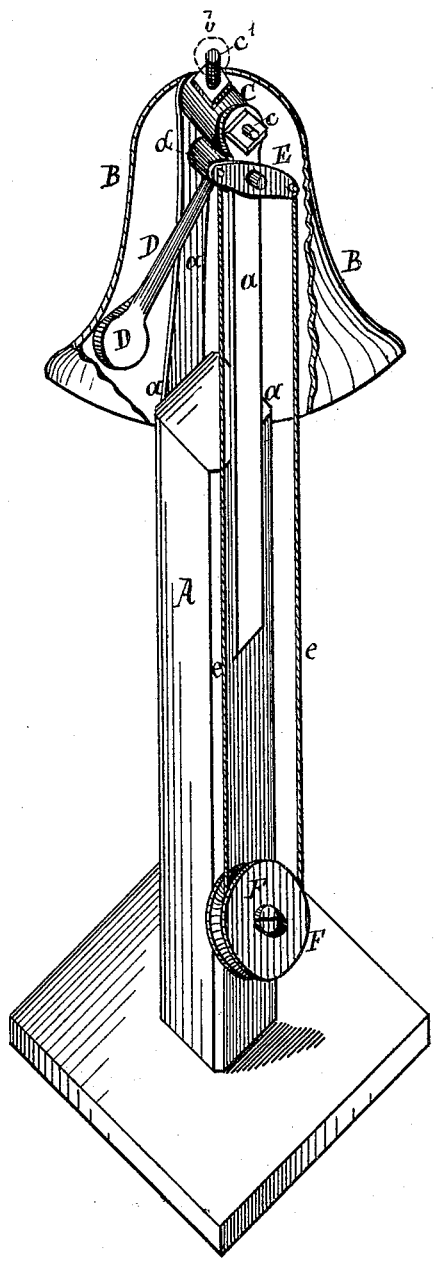
Witnesses
Henry Orth
W. E. Chaffee
Inventor
Henry Fisher
p' Abbott & Co

UNITED STATES PATENT OFFICE.

HENRY FISHER, OF CANTON, OHIO.

IMPROVEMENT IN BELL-HANGING.

Specification forming part of Letters Patent No. 175,600, dated April 4, 1876; application filed March 3, 1876.

*To all whom it may concern:*

Be it known that I, HENRY FISHER, of Canton, in the county of Stark and State of Ohio, have invented certain new and useful Improvements in Hanging and Striking Bells; and I do hereby declare that the following is a full, clear, and exact description thereof, which will enable others skilled in the art to which it appertains to make and use the same, reference being had to the accompanying drawings, and to the letters of reference marked thereon, which form a part of this specification.

In the drawing, which is a perspective view of my invention, a portion of the bell being broken away, A represents the supporting-standard, the upper end of which is bifurcated, as at $a$ $a$, the arms $a$ $a$ being made of metal, in order the better to support the working mechanism to be described. B is the bell, provided with an opening in the crown. C is a rocking hub, supported upon a pivot, $c$, which, in turn, rests in suitable bearings formed for its reception in the upper end of each of the arms $a$ $a$.

When it is desired that the rocking hub should vibrate upon the pivot the pivot-hole in one of the arms may be squared, and a short section of the pivot near one end correspondingly squared, which prevents the pivot from rotating in its supporting-holes.

Under another construction I propose to cast stub-axles or pintle-studs upon each end of the rocking hub, making these studs of such length that a screw-thread may be cut upon their outer ends to receive nuts.

C' is a wrought-iron shank projecting upwardly from hub C, and screw-threaded. The bell rests upon the hub C, and is secured thereto by means of a nut, $b$, but is free to rotate horizontally about shank $c'$ as a center, the thread upon the shank being cut to such distance only as will permit the nut $b$ to be screwed down firmly without binding the bell so tightly upon the hub C as to prevent it (the bell) from rotating freely.

Thus it will be seen that the bell is mounted upon the bifurcated standard by means of two pivots, which are arranged at right angles to each other, and constitute a universal joint.

D is the hammer, the shank D' of which is attached to a rock-shaft, $d$, journaled in the arms $a$ $a$ of the standard. E is a lever attached to rock-shaft $d$, and connected with a pulley, F, by cords $e$ $e$; or, when desired, a lever may be substituted for pulley F. When the pulley is used I usually secure a crank thereto, and it is apparent that with either of these latter constructions the desired blows can be readily struck upon the bell by hammer D. The nut $b$ should be of such size as to extend across the flat portion of the crown or dome of the bell, and thus insure that the rain shall be excluded from the devices, which are inclosed within the bell.

Having thus described my invention, what I claim is—

As a support for the bell B, the rocking hub C, supported between the arms $a$ $a$ of the bifurcated standard, and provided with the upright shank C', substantially as set forth.

In testimony that I claim the foregoing as my own I affix my signature in presence of two witnesses.

HENRY FISHER.

Witnesses:
MARCUS E. WILCOX,
PERCY S. SOWERS.